US008020882B2

(12) United States Patent
D'Aponte et al.

(10) Patent No.: US 8,020,882 B2
(45) Date of Patent: Sep. 20, 2011

(54) TRAILING ARM FOR A MOTOR-VEHICLE REAR INDEPENDENT SUSPENSION

(75) Inventors: Armando D'Aponte, Alessandria (IT); Michele Spina, Turin (IT)

(73) Assignee: Sistemi Sospensioni S.p.A., Milan (IT)

( * ) Notice: Subject to any disclaimer, the term of this patent is extended or adjusted under 35 U.S.C. 154(b) by 65 days.

(21) Appl. No.: 12/375,604

(22) PCT Filed: Jul. 31, 2007

(86) PCT No.: PCT/IB2007/053015
§ 371 (c)(1),
(2), (4) Date: Jan. 29, 2009

(87) PCT Pub. No.: WO2008/015636
PCT Pub. Date: Feb. 7, 2008

(65) Prior Publication Data
US 2009/0315291 A1 Dec. 24, 2009

(30) Foreign Application Priority Data
Aug. 1, 2006 (IT) .............................. TO2006A0572

(51) Int. Cl.
*B60G 3/14* (2006.01)
(52) U.S. Cl. ..... 280/124.133; 280/124.13; 280/124.148; 280/124.153
(58) Field of Classification Search ........... 280/124.128, 280/124.13, 124.133, 124.148, 124.153, 280/5.524; *B60G 3/14, 3/22, 3/26*
See application file for complete search history.

(56) References Cited

U.S. PATENT DOCUMENTS

| 3,193,302 | A | * | 7/1965 | Hill ........................ 280/124.128 |
| 3,292,944 | A | * | 12/1966 | Dangauthier .......... 280/124.107 |
| 4,696,488 | A | | 9/1987 | Mitobe et al. |
| 4,740,011 | A | | 4/1988 | Mitobe et al. |
| 4,840,393 | A | | 6/1989 | Mueller et al. |
| 4,911,467 | A | * | 3/1990 | Alesso et al. .......... 280/124.133 |
| 6,138,357 | A | | 10/2000 | Jones |

FOREIGN PATENT DOCUMENTS

| DE | 41 29 643 A1 | 3/1993 |
| EP | 0 185 899 A2 | 7/1986 |
| EP | 0 277 649 A1 | 8/1988 |
| EP | 0 302 226 A2 | 2/1989 |
| EP | 1 216 858 A2 | 6/2002 |
| FR | 1 353 915 A1 | 1/1964 |
| FR | 2 604 400 A1 | 4/1988 |
| FR | 2 832 099 A1 | 5/2003 |
| JP | 02-053620 A | 2/1990 |
| JP | 08-034219 A | 2/1996 |
| WO | 2007/024919 A2 | 3/2007 |

* cited by examiner

*Primary Examiner* — Paul N Dickson
*Assistant Examiner* — Keith Frisby
(74) *Attorney, Agent, or Firm* — Sughrue Mion, PLLC

(57) ABSTRACT

A trailing arm for a rear independent suspension of a motor vehicle. The arm (10) includes a beam-like mounting structure (32) and a plurality of components including a first component (38, 40) for the mounting of a first bush (20) for articulated connection of the trailing arm (10) to the vehicle structure, a second component (42) for support of a wheel-carrying spindle; a third component (50, 56) for the mounting of a second bush (22) for articulated connection of the trailing arm (10) to a first rod (12), a fourth component (58) for the mounting of a third bush (24) for articulated connection of the trailing arm (10) to a second rod (12), a fifth component (28) for support of a spring, a sixth component (64) for connection of the trailing arm (10) to a shock absorber (16), and a seventh component (66) for connection of the trailing arm (10) to a torsion bar (18).

9 Claims, 4 Drawing Sheets

TRAILING ARM FOR A MOTOR-VEHICLE REAR INDEPENDENT SUSPENSION

BACKGROUND OF THE INVENTION

The present invention relates to a trailing arm for a motor-vehicle rear independent suspension.

Motor-vehicle rear independent suspensions are known which comprise:
- a trailing arm which is articulated at a front end thereof to the vehicle structure and is provided, usually at a rear end thereof, with a mounting structure for the spindle of the respective rear wheel;
- at least one pair of rods which connect the trailing arm to the vehicle structure; and
- a spring and a shock absorber which can be coaxial with each other to form a single spring and shock absorber unit or differently positioned and oriented with respect to each other, and which are each interposed between the vehicle structure and the trailing arm or between the vehicle structure and a link rod.

The two trailing arms are also usually connected with each other by means of a torsion bar.

SUMMARY OF THE INVENTION

It is an object of the present invention to provide a trailing arm for a motor-vehicle rear independent suspension of the above-identified type, which makes it possible to reduce the manufacturing costs of the suspension and which can be easily adapted each time to the specific application.

BRIEF DESCRIPTION OF THE DRAWINGS

The invention will be more clearly understandable in the light of the following description, given purely by way of non-limiting example with reference to the appended drawings, in which.

In the description and the claims which follow, terms such as "longitudinal" and "transverse", "inner" and "outer", "front" and "rear", "upper" and "lower" etc. are to be intended as referred to the assembled condition of the suspension on a motor-vehicle.

DETAILED DESCRIPTION OF THE PREFERRED EMBODIMENTS

Figure 1:
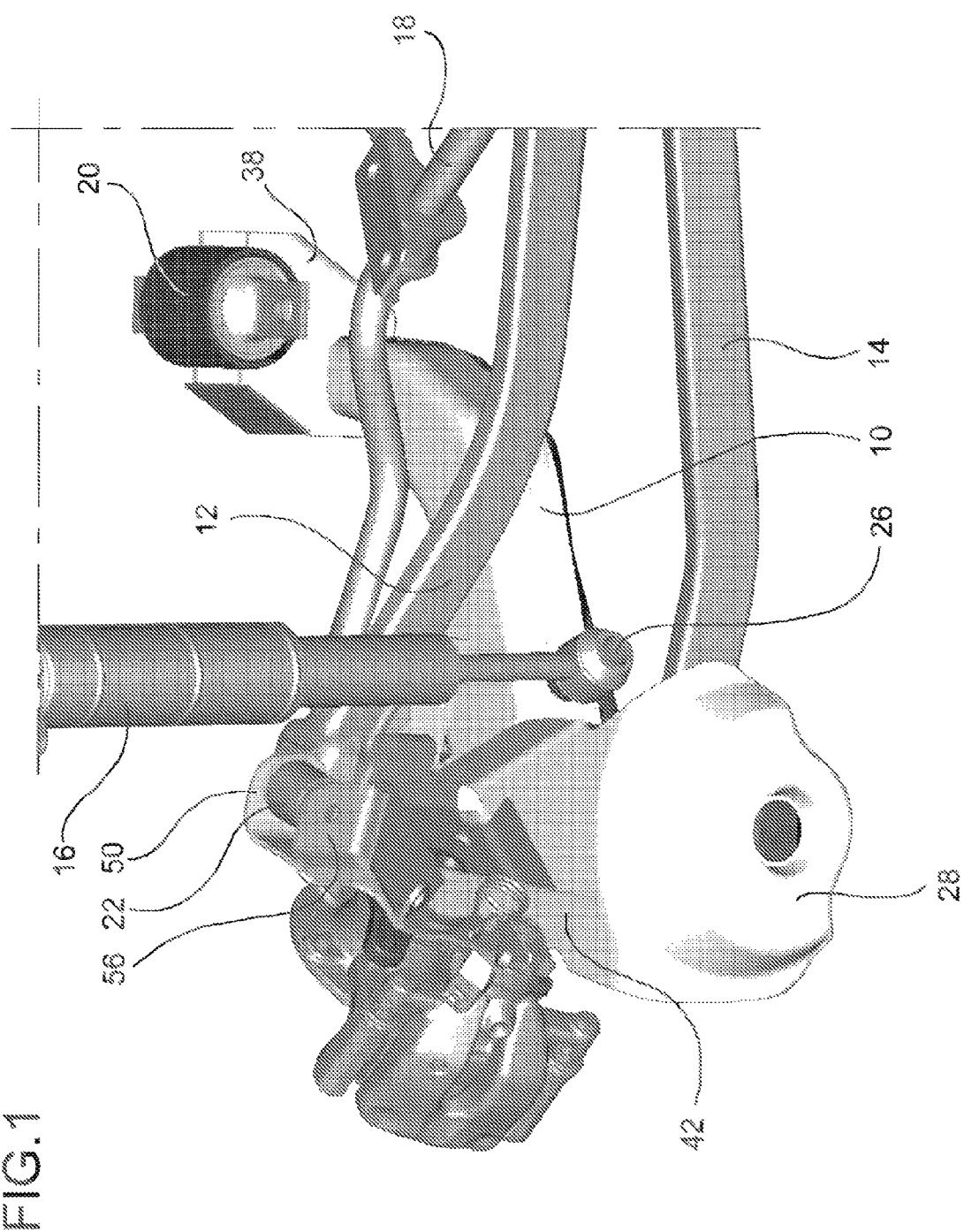
FIGS. 1 and 2 are perspective views, from above and from below, respectively, of a motor-vehicle rear independent suspension according to a preferred embodiment of the invention.
Figure 2:
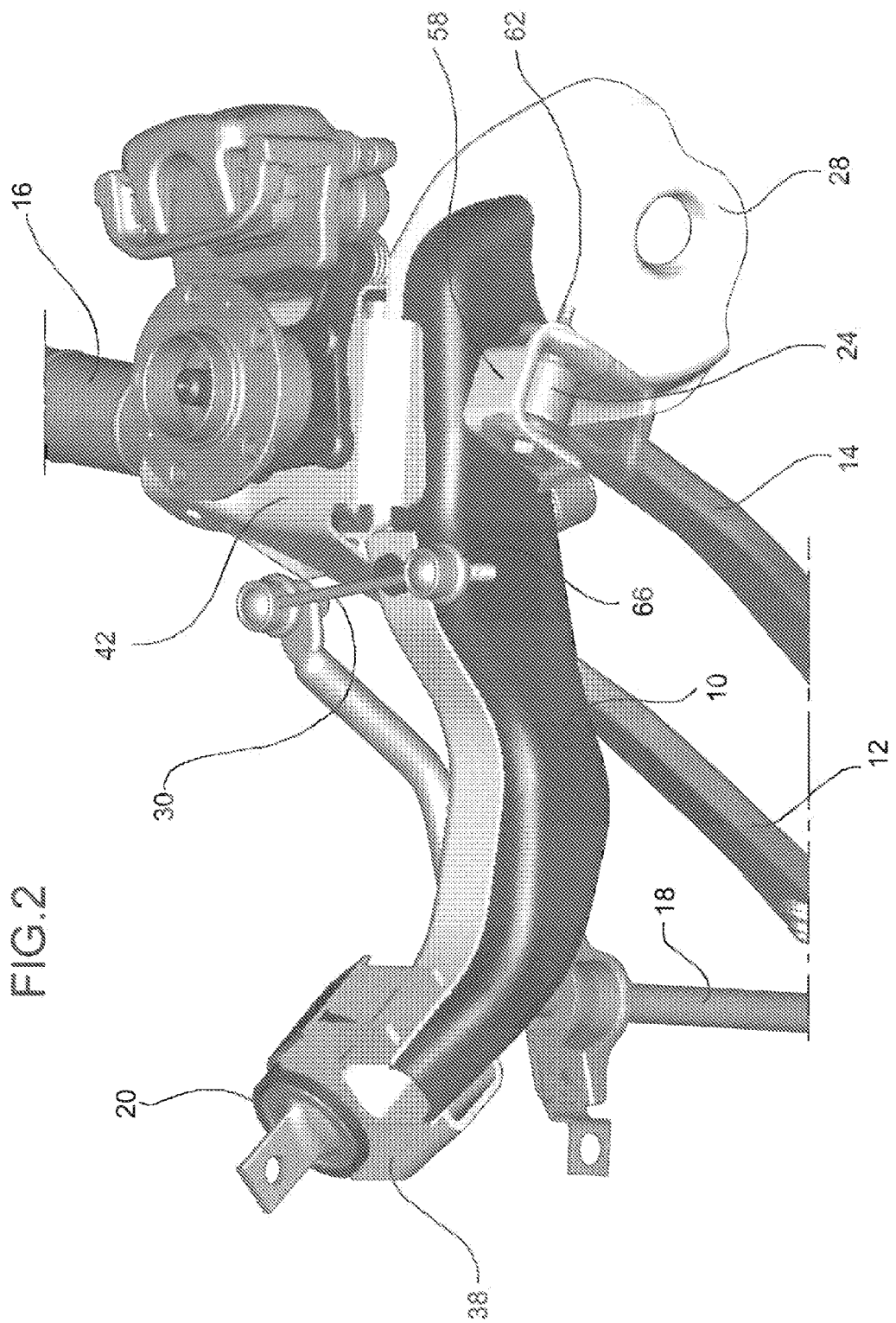

With reference first to FIGS. 1 and 2, a motor-vehicle rear independent suspension comprises in per-se-known manner a trailing arm 10, which is articulated at a front end thereof to the vehicle structure and supports at a rear portion thereof a respective rear wheel of the vehicle (not illustrated), a pair of rods 12 and 14, each of which connects the arm 10 to the vehicle structure, a spring (not illustrated) and a shock absorber 16 which are each interposed between the arm 10 and the vehicle structure, and a torsion bar 18 which connects the illustrated trailing arm 10 to an identical trailing arm associated to the other wheel of the vehicle.

The trailing arm 10 is articulated to the vehicle structure by means of a bush 20, which in the illustrated embodiment is oriented obliquely to the axis of the rear wheel. The trailing arm 10 is arranged to control three degrees of freedom of the wheel.

The upper link rod 12 is articulated at a first end to the trailing arm 10 by means of a bush 22. The lower link rod 14 is articulated at a first end to the trailing arm 10 by means of a bush 24. The two link rods 12 and 14 control each one degree of freedom of the wheel.

The shock absorber 16 is articulated at its lower end directly to the trailing arm 10 by means of a pin 26, whereas the spring rests with its lower end on a plate 28 of the trailing arm 10.

The torsion bar 18 is connected at each of its lateral ends to the respective trailing arm 10 by means of a connecting rod 30 (FIG. 2).

Figure 3:
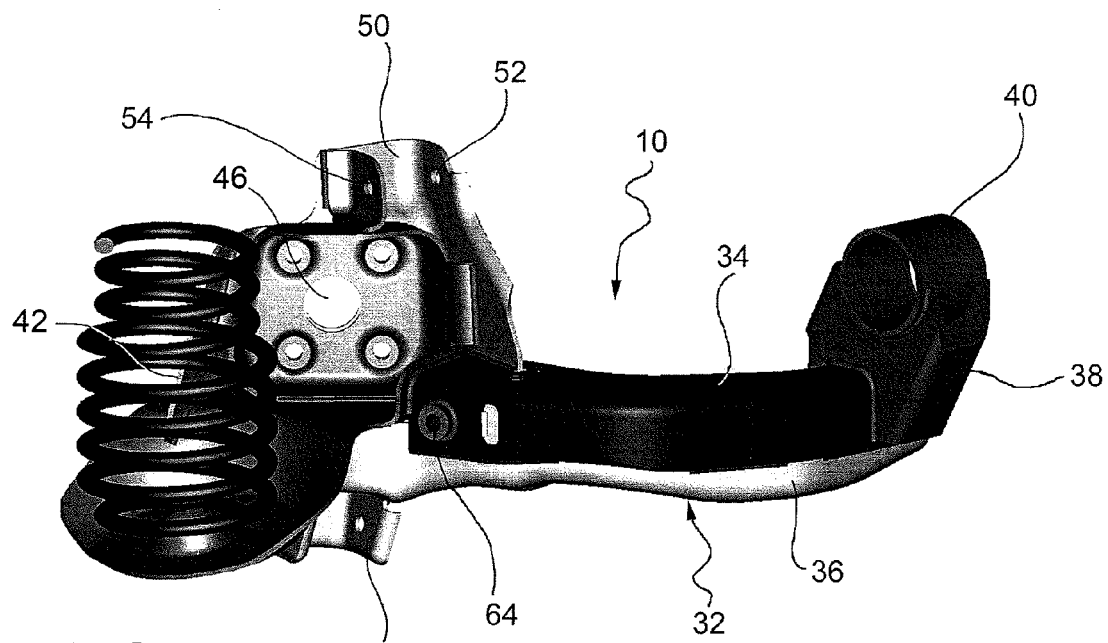
FIGS. 3 and 4 are perspective views, from the inside and from the outside, respectively, with reference to the transverse direction of the vehicle, of the trailing arm of the suspension shown in FIGS. 1 and 2.
Figure 4:
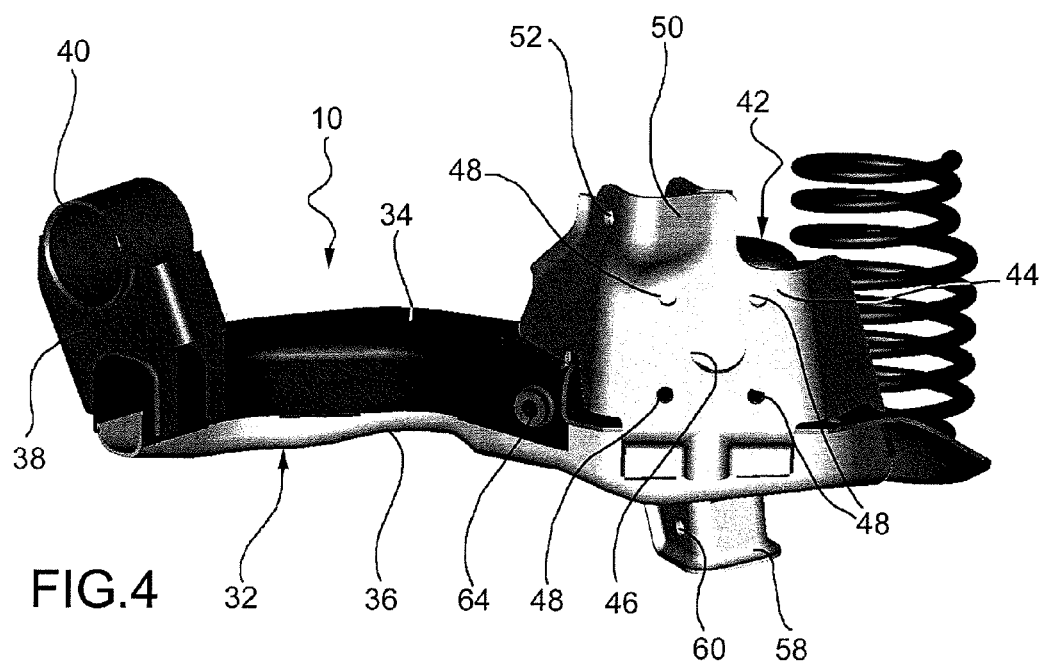
Figure 5:
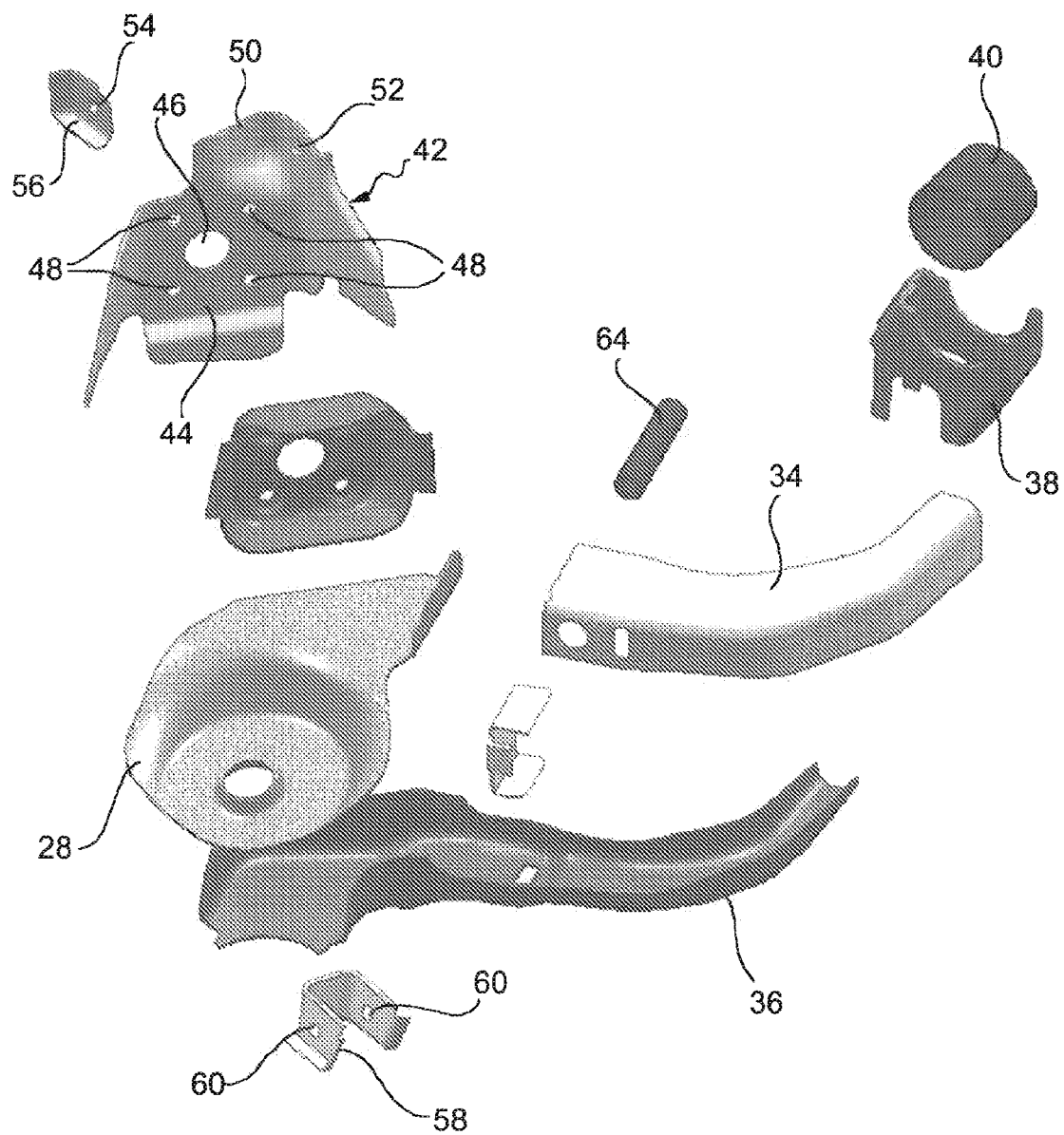
FIG. 5 is an exploded perspective view of the trailing arm of FIGS. 3 and 4.

With reference now to FIGS. 3 to 5, the structure of the trailing arm 10 will be described in greater detail.

The trailing arm 10 comprises a beam-like mounting structure 32. In the illustrated embodiment, the mounting structure 32 has a closed cross-section and is formed by an upper sheet metal part 34 and a lower sheet metal part 36, which have a U-like cross-section and are securely connected with each other.

A number of components separate from each other and having each a specific function, namely the function of connecting the trailing arm 10 to the vehicle structure, the function of connecting the rods 12 and 14 to the trailing arm 10, the function of connecting the shock absorber 16 to the trailing arm 10, the function of supporting the spring, the function of connecting the torsion bar 18 to the trailing arm 10 and the function of supporting the wheel-carrying spindle, are attached to the mounting structure 32. Conveniently, all these components are stamped sheet metal parts.

The function of connecting the trailing arm 10 to the vehicle structure is performed by a part 38, for example a sheet metal part, which is firmly secured to the front end of the mounting structure 32 and carries a cylindrical seat 40 for the articulation bush 20.

The function of connecting the upper rod 12 to the trailing arm 10 and of supporting the wheel-carrying spindle is performed by a part 42, for example a sheet metal part, which forms a vertical wall 44, in which a central hole 46 and a number (usually four) of holes 48 arranged around the central hole 46 for insertion of fixing screws (not illustrated) are provided, and an upper attachment portion 50 for attachment of the bush 22, in which portion a hole 52 for the respective articulation pin (not illustrated) is provided. A second hole 54 aligned with the hole 52 is provided in a further part 56, for example a sheet metal part, which is securely connected to the upper attachment portion 50.

The function of connecting the lower rod 14 to the trailing arm 10 is performed by a bracket-like part 58, for example a sheet metal part, which has a pair of aligned holes 60 for an articulation pin 62 (FIG. 2) of the bush 24.

The function of connecting the shock absorber 16 to the trailing arm 10 is performed by a spacer 64, which is made in the illustrated example as a hollow cylindrical element and is fixed to the upper sheet metal part 34 of the mounting structure 32. The above-mentioned articulation pin 26 is inserted into the spacer 64.

The function of supporting the spring is performed by the above-mentioned plate 28.

Finally, the function of connecting the torsion bar 18, or rather the connecting rod 30, to the trailing arm 10 is performed by a sheet metal part 66 (FIG. 2) firmly secured to the mounting structure 32 of the trailing arm 10.

As can be understood from the foregoing description, the trailing arm according to the invention is therefore characterized in that it comprises a plurality of separate components, which are made for example as stamped sheet metal parts arranged to perform each a specific function. The trailing arm thus has a modular structure which provides a functional de-coupling, that is, the possibility to change the type and/or the geometry of the single functional components with no need to change the remaining parts of the arm. The geometry of the mounting structure of the trailing arm remaining unchanged, all the functional components can in fact be changed independently of each other to meet the requirements imposed each time by the specific application. It is thus possible to produce trailing arms designed for vehicles belonging to different weight- and use-classes by always adopting the same mounting structure. This clearly allows to achieve significant advantages in terms of costs and process.

Naturally, the principle of the invention remaining unchanged, the embodiments and constructional details may vary widely with respect to those described and illustrated purely by way of non-limiting example.

For example, the shock absorber 16 may form, along with the spring, a spring and shock absorber unit supported by the plate 28. Alternatively, the shock absorber 16 may be connected to, or supported by, a component of the suspension other than the trailing arm 10.

The spring might also be supported by a component of the suspension other than the trailing arm 10. In that case, the plate 28 would clearly be omitted.

At least another rod for connecting the trailing arm 10 to the vehicle structure might also be provided. In that case, the trailing arm 10 would include a further special component, for example a sheet metal component, for performing the function of connecting the trailing arm 10 to this further rod.

Also the torsion bar 18 might be connected to a component of the suspension other than the trailing arm 10, with resulting removal of the part 66 intended to perform the function of attachment of the torsion bar.

Moreover, the mounting structure 32 of the trailing arm may also have a closed cross-section of a different shape from the one illustrated or an open cross-section.

Finally, the mounting structure and/or the other components or parts of the trailing arm 10 may be made not only of sheet metal (steel or aluminum or other metals), but may also be made of plastic material reinforced with glass or carbon fibres, or of cast metal, or again may be formed by extruded components.

The invention claimed is:

1. Rear independent suspension for a motor-vehicle comprising:
   a trailing arm (10) for articulated connection at a front end thereof to a vehicle structure and for support at a rear portion thereof of a respective rear wheel of the vehicle,
   a first (12) and a second (14) rod, each of which connects the trailing arm (10) to the vehicle structure and are arranged to control one degree of freedom of the wheel,
   wherein the trailing arm (10) comprises a beam-like mounting structure (32) and a plurality of components separately formed and separate from each other and securely connected, directly or indirectly, to the mounting structure (32) to perform each a specific function, said plurality of components including a first component (38, 40) for the mounting of a first bush (20) for articulated connection of the trailing arm (10) to the vehicle structure, and a second component (42) for support of a wheel-carrying spindle;
   wherein the trailing arm (10) is arranged to control three degrees of freedom of the wheel, and
   wherein said plurality of components further includes a third component (50, 56) for the mounting of a second bush (22) for articulated connection of the trailing arm (10) to the first rod (12), and a fourth component (58) for the mounting of a third bush (24) for articulated connection of the trailing arm (10) to the second rod (12).

2. Rear independent suspension according to claim 1, further comprising a spring, wherein said plurality of components further includes a fifth component (28) for support of the spring.

3. Rear independent suspension according to claim 2, further comprising a shock absorber (16), wherein said plurality of components further includes a sixth component (64) for connection of the trailing arm (10) to the shock absorber (16).

4. Rear independent suspension according to claim 3, further comprising a torsion bar (18), wherein said plurality of components further includes a seventh component (66) for connection of the trailing arm (10) to the torsion bar (18).

5. Rear independent suspension according to claim 1, wherein said components are sheet metal parts or plastics parts reinforced with one of glass, carbon fibres, and metal parts.

6. Rear independent suspension according to claim 5, wherein said sheet metal parts are stamped sheet metal parts.

7. Rear independent suspension according to claim 1, wherein the mounting structure (32) includes at least one sheet metal part.

8. Rear independent suspension according to claim 1, wherein the mounting structure (32) has a closed cross-section and includes two sheet metal parts (34, 36) connected to each other.

9. Rear independent suspension according to claim 8, wherein said sheet metal parts are stamped sheet metal parts.

* * * * *